Aug. 14, 1951     E. E. JACKSON ET AL     2,564,625
FISHING ROD HOLDER
Filed May 23, 1946
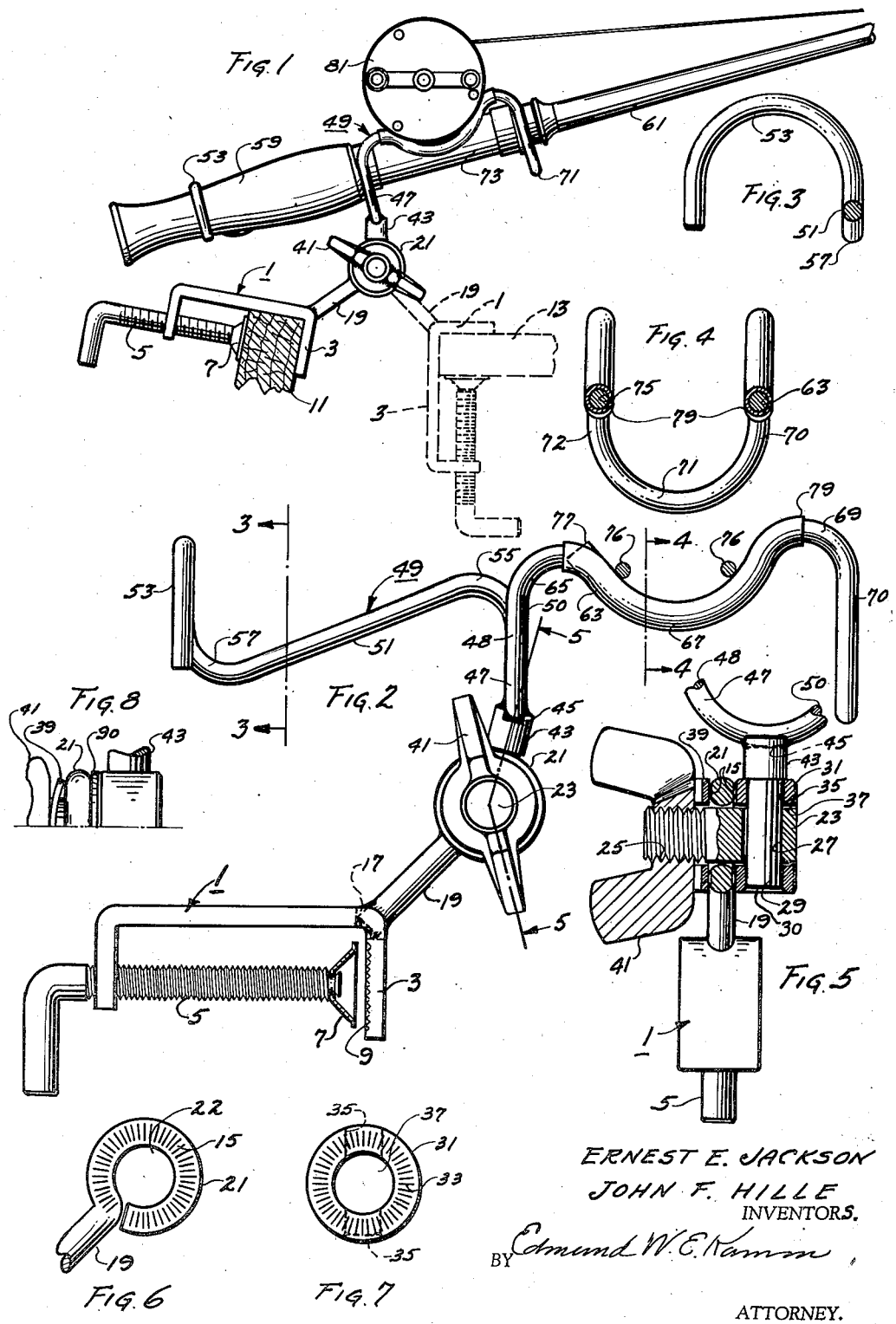
ERNEST E. JACKSON
JOHN F. HILLE
           INVENTORS.
BY Edmund W. E. Kamm
              ATTORNEY.

Patented Aug. 14, 1951

2,564,625

UNITED STATES PATENT OFFICE 2,564,625

FISHING ROD HOLDER

Ernest E. Jackson and John F. Hille,
Fort Wayne, Ind.

Application May 23, 1946, Serial No. 671,714

3 Claims. (Cl. 43—21.2)

This invention relates to a holder for a fishing rod. More particularly it relates to a holder which is particularly adapted to hold a rod firmly in position for instant action.

It is an object of the invention to supply a holder which may be adjusted substantially universally to any desired position.

It is another object of the invention to provide a rod holder which will maintain the position to which it is adjusted.

Another object of the invention is to provide a rod holder in which provision is made for supporting the reel in the proper position for action.

Yet another object of the invention is to provide a holder which is simple and easily manufactured.

A further object of the invention is to provide a holder which can be clamped upon any convenient support.

Another object of the invention is to provide a support, a cradle, and a universal connection therebetween.

These and other objects will become apparent from a study of the specification and the drawings which are attached hereto and made a part hereof and in which:

Figure 1 is an elevation showing in full lines, the holder attached to the gunwale of a boat and in dashed lines attached to a seat, with the fishing rod and reel supported by it.

Figure 2 is an enlarged elevation of the complete holder.

Figure 3 is a sectional view taken on the line 3—3 of Figure 2 showing the inboard loop of the holder.

Figure 4 is a sectional view taken on line 4—4 of Figure 2 showing the outboard end of the holder.

Figure 5 is a sectional view taken substantially on the line 5—5 of Figure 2 showing the universal clamp.

Figure 6 is an elevation of the ring member showing the radial knurling or serrations which may be employed to facilitate clamping.

Figure 7 is an elevation of the clamping collar.

Figure 8 is an elevation of a structure similar to that shown in Figure 5 but showing a friction washer instead of serrations.

Referring now to Figure 1, the numeral 1 refers to a C-clamp which has a clamping jaw 3, and clamping screw 5 which is provided with a self-aligning pad 7 on its inner end. If desired the clamping jaw 3 may be serrated or toothed as shown at 9 (Figure 2) to afford better gripping action on the gunwale 11, seat 13 or other part of the boat.

At the corner of the C-clamp adjacent the clamping jaw, a hole 17 is provided and the shank 19 of a ring member 21, which has axial opening 22, is fixed in the hole as by brazing or in any other suitable manner. The hole 17 is preferably drilled or pierced before the clamp is bent. Bending then spreads the hole so as to provide room for the brazing material. The shank extends preferably about 135 degrees to the clamping jaw. Both faces of the ring member may be radially knurled or serrated as shown at 15 in Figures 5 and 6.

A cylindrical clamping stud 23 (Figure 5) is passed through opening 22, is threaded at 25 and is provided with a transverse hole 27 for the reception of the swivel post 29.

A collar 31 which has substantially the same diameter as ring 21 is mounted on the stud and its radial faces may be serrated or knurled as at 33. The pitch and depth of the serrations on the ring and collar should be the same so that there will be definite intermeshing. The collar is provided with a transverse hole 35 which is countersunk at the bottom. The swivel post is passed through hole 35 in the collar and hole 27 in the stud and is flared into the countersinking as shown at 30 to hold the post in place in the collar and stud although it is loose enough to permit the post to turn about its own axis. The axial hole 37 receives stud 23 as does the opening 22 in the ring.

A spring washer 39 which is preferably bowed about a diameter, bears against the ring 21 at one side and a wing nut 41 is threaded on the stud 23 and confines the washer on the other side.

The swivel post 29 is provided with a head 43 which rests upon the collar 31 and which is grooved at 45 to receive the central transverse loop 47 of the cradle 49 which is brazed or otherwise fixed in place.

The cradle comprises the central transverse loop 47 which is U-shaped in elevation and open upwardly. From one leg 48 of the loop an arm 51 extends in an inboard direction and downwardly in a plane which is substantially normal to the plane of the loop 47. The arm joins the bottom of one leg of a downwardly open transverse U-shaped loop 53, the plane of which is parallel to that of loop 47 (see Figures 1, 2 and 3). The arm is joined to the loops by means of suitable curved sections 55 and 57. The loops extend in the same direction from the arm so that the grip portion 59 of the rod 61 may be received in both loops.

From the other leg 50 of the loop 47 an arm 63 extends in a direction opposite to that of arm 51, that is, in an outboard direction. It is joined by curve 65 to the leg 50, is provided with a depressed or downwardly bowed portion 67 intermediate its ends and is joined at its outer end by a suitable curved section 69 to a leg 70 of the upwardly open, U-shaped loop 71 as shown in Figures 1, 2 and 4 which is adapted to receive the portion of the rod 61 which is disposed outwardly of the reel seat section 73. The plane of loop 71 is parallel to those of the other loops. An arm 75 is connected with the other leg 72 of loop 71 and extends parallel to and has the same conformation as arm 63. The arm 75 terminates adjacent the central loop as shown by line 77 in Figure 2.

Tubes 79 of rubber or other yieldable material are slipped over the arms 63 and 75 in the region of the bowed portion 67 so as to receive a reel 81 without marring the usual polished finish thereof.

If desired, the serrations 15 and 33 of the ring 21 and collar 31 may be omitted and a friction washer 90 of fiber or other suitable friction material may be inserted between the contiguous faces of the two parts, as shown in Figure 8. It is also possible to use serrations on the contiguous faces on the ring 21 and collar 31 where the fiber washer is used. This increases the friction in the joint.

Where the serrations are used, both sides of each the ring 21 and the collar 31 are serrated so that they may be assembled with either side of one contiguous to either side of the other.

Operation

In use, the C-clamp will be applied to the gunwale, seat or other convenient, fixed member by simply tightening the screw 5. The pad 7, being floatingly mounted on the end of the screw, will align itself with one surface and the serrations 9 will grip the opposite surface firmly.

The wing nut 41 is then loosened and as soon as the strain of washer 39 is relieved, the stud 23 will move to the right and free the swivel post 29 for rotation. If the fiber washer is used, the amount of relief of the wing nut will also allow the adjustment of collar 31 with respect to ring 21 about the axis of stud 23.

When the parts are properly positioned the wing nut is retightened and the parts are clamped together to prevent displacement.

In case the serrated surfaces are used, the wing nut must be loosened sufficiently to permit the teeth to clear before adjustment of the cradle about the axis of stud 23 can take place. The serrations assist in holding the adjustment especially where a long heavy pole, such as a cane pole, is held in the cradle.

Where a casting rod 61 having a real 81 is mounted in the cradle, the bowed or depressed portions 67 of the arms 63, 75 engage the tie bars 76 of the reel and support the reel while the loop 53 engages the lower end of the hand grip 59. The cradle thus maintains the reel and its winding crank in the proper position for grasping when a fish strikes. It also allows the reel handle to revolve letting out line when a fish strikes so as to prevent damage to the reel handle, or the pole itself due to violent action of large fish and to prevent breaking the line. The spacing of the arms 63 and 75 is such that they will engage a casting reel of the usual size so that the reel and not the pole is engaged by these arms. Since this is true, the holder will support even rods having offset reel seats.

The outboard loop 71 and the reel flanges keep the rod from shifting laterally far enough to displace the reel from the arms.

When a cane pole or other rod not having a reel is used, the outboard loop 71 supports the rod in an upward direction while the inboard loop 53 supports the inner end against upward tilting. The unbalanced weight of the pole in the last case is sufficient to cause the end loops to grip the pole with sufficient frictional force to prevent axial movement of the pole provided the vertical angle of the pole is not excessive. In the case of the casting rod, this force is assisted by the fact that the reel is seated in the depressions 67.

It is obvious that various changes may be made in the form, structure and arrangement of parts without departing from the spirit of the invention. Accordingly, applicants do not desire to be limited to the specific embodiment disclosed herein primarily for purposes of illustration; but instead, they desire protection falling fairly within the scope of the appended claims.

What we claim to be new and desire to protect by Letters Patent of the United States is:

1. In a fishing rod holder the combination of supporting means adapted for attachment to a fixed member, a post connected to said member, a cradle comprising a central upwardly open two-legged loop fixed at its center to said post, an arm extending rearwardly and downwardly from one of the legs and provided with a downwardly open loop, said loop being in a plane parallel to the plane of said central loop, an arm extending forwardly from the other leg of said central loop and having an outer, upwardly open loop formed at its end, the plane of the latter loop being parallel to that of said central loop.

2. In a fishing rod holder the combination of supporting means adapted for attachment to a fixed member, a post connected to said member, a cradle comprising a central upwardly open two-legged loop fixed at its center to said post, an arm extending rearwardly and downwardly from one of the legs and provided with a downwardly open loop, said loop being in a plane parallel to the plane of said central loop, an arm extending forwardly from the other leg of said central loop and having an outer upwardly open loop formed at its end, the latter loop being in a plane parallel to that of said central loop, said forwardly extending arm being bowed downwardly to form a reel seat.

3. In a fishing rod holder the combination of supporting means adapted for attachment to a fixed member, a post connected to said member, a cradle comprising a central upwardly open two-legged loop fixed at its center to said post, an arm extending rearwardly and downwardly from one of the legs and provided with a downwardly open loop parallel to said central loop, an arm extending forwardly from the other leg of said central loop and having an outer, upwardly open loop formed at its end, said loop being in a plane parallel to the plane of said central loop, a second arm extending backwardly from said outer loop and being in a plane parallel to the plane of said last named arm, said forwardly and backwardly extending arms being bowed downwardly to form a reel seat.

ERNEST E. JACKSON.
JOHN F. HILLE.

REFERENCES CITED

The following references are of record in the file of this patent:

UNITED STATES PATENTS

| Number | Name | Date |
|---|---|---|
| 448,028 | Hall | Mar. 10, 1891 |
| 1,626,333 | Fain | Apr. 26, 1927 |
| 1,963,535 | Trotter | June 19, 1934 |
| 2,220,234 | Hadaway | Nov. 5, 1940 |
| 2,293,305 | Oldham | Aug. 18, 1942 |
| 2,309,350 | Nanasko | Jan. 26, 1943 |
| 2,369,865 | Spencer | Feb. 20, 1945 |
| 2,416,828 | Hamre | Mar. 4, 1947 |